UNITED STATES PATENT OFFICE.

ALEXANDER CLASSEN, OF AACHEN, GERMANY.

PROCESS OF CONVERTING WOOD INTO FERMENTABLE SUGARS.

SPECIFICATION forming part of Letters Patent No. 647,805, dated April 17, 1900.

Application filed January 29, 1900. Serial No. 3,202. (No specimens.)

*To all whom it may concern:*

Be it known that I, ALEXANDER CLASSEN, a citizen of Germany, residing at Aachen, in the Empire of Germany, have invented a certain new and useful Process of Converting Wood into Fermentable Sugars, (for which I have made application for patent in the following countries, viz: Germany, July 14, 1899; Denmark, December 4, 1899; Sweden, December 8, 1899; Finland, December 22, 1899; France, January 3, 1900, and Belgium, January 3, 1900,) of which the following is a specification.

By the action of strong sulphuric acid ligneous fiber, as is known, is converted into soluble ligneous sulphuric acid. If this acid solution be diluted with water and boiled for a long time, glucose is formed.

My invention relates to a process for obtaining easily and quickly a good yield of sugar from sawdust and the like by treating the material under certain conditions with chamber-acid—that is, sulphuric acid having a specific gravity of 50° to 60° Baumé. For this purpose one part, by weight, of air-dried sawdust (containing about fifteen per cent. of water) is mixed with about three-fourths part, by weight, of sulphuric acid of specific gravity 55° to 60° Baumé. A dry greenish mass is formed, which yields no sugar to water. This mass is subjected to a pressure produced by a hydraulic press or otherwise, whereupon a chemical reaction ensues and heat is evolved from the mass, which becomes black and hard, the pressure being continued until this result is attained, generally about half an hour. The mass is then broken up and mixed with four parts, by weight, of water, and the mixture is boiled for half an hour. The solution thus obtained is ready for treatment in the known manner.

In this process the greater part of the cellulose capable of conversion is converted into sugar by the pressure; but some portion is converted into intermediate products, between dextrin and glucose. These products, however, are readily converted into sugar when the mass is boiled with water in an open vessel.

If sawdust is treated with a more dilute acid—for instance, sulphuric acid of 50° Baumé specific gravity—other conditions being the same as those given, a similar reaction occurs but the yield of sugar is less.

As to the nature of the solution obtained by this process the liquid is free from decomposition products injurious to fermentation, by which it differs essentially from the solutions obtained by processes hitherto in use. Sugar produced by my process can, indeed, be fermented in the same time as the purest glucose of commerce.

It may be assumed that the yield obtained with acid of 55° to 60° Baumé used in the above-stated proportions is about forty per cent., (estimated as glucose by Fehling's solution.) The yield may be increased to sixty per cent. and more by increasing the quantity of acid of the strength named. Inasmuch as the solution after neutralization with calcium carbonate is nearly colorless, it can be concentrated easily to a sweet syrup, and the manufacture of glucose from sawdust is now possible under economical conditions.

Having thus described the nature of this invention and the best means I know of carrying the same into practical effect, I claim—

The process for converting wood into sugar which consists in mixing the material with sulphuric acid of 55° to 60° Baumé specific gravity, then compressing the mixture, then breaking up the product and boiling it with water for a short time in an open vessel, substantially as described.

In testimony whereof I have hereunto set my hand in presence of two subscribing witnesses.

ALEXANDER CLASSEN.

Witnesses:
    C. E. BRUNDAGE,
    G. SCOTT.